(12) United States Patent
Ranki et al.

(10) Patent No.: US 9,148,761 B2
(45) Date of Patent: Sep. 29, 2015

(54) POSITIONING

(75) Inventors: Ville Valtteri Ranki, Jorvas (FI); Antti Paavo Tapani Kainulainen, Nummela (FI); Fabio Belloni, Espoo (FI)

(73) Assignee: Nokia Technologies Oy, Espoo (FI)

( * ) Notice: Subject to any disclaimer, the term of this patent is extended or adjusted under 35 U.S.C. 154(b) by 208 days.

(21) Appl. No.: 13/876,985

(22) PCT Filed: Oct. 29, 2010

(86) PCT No.: PCT/IB2010/054905
§ 371 (c)(1),
(2), (4) Date: Nov. 7, 2013

(87) PCT Pub. No.: WO2012/042315
PCT Pub. Date: Apr. 5, 2012

(65) Prior Publication Data
US 2014/0051461 A1 Feb. 20, 2014

Related U.S. Application Data

(63) Continuation of application No. PCT/IB2010/054426, filed on Sep. 30, 2010, and a continuation of application No. PCT/IB2010/054425, filed on Sep. 30, 2010.

(51) Int. Cl.
*H04W 4/02* (2009.01)
*G01S 5/24* (2006.01)
*G01S 3/74* (2006.01)

(52) U.S. Cl.
CPC ............... *H04W 4/026* (2013.01); *G01S 5/24* (2013.01); *G01S 3/74* (2013.01)

(58) Field of Classification Search
CPC ........... G01S 5/04; G01S 5/24; G01S 5/0257; G01S 5/22; H04W 4/02; H04W 4/026; H04W 64/00
See application file for complete search history.

(56) References Cited

U.S. PATENT DOCUMENTS 6,121,927 A    9/2000  Kalliojarvi
(Continued)

FOREIGN PATENT DOCUMENTS

| WO | WO95/14936 | 6/1995 |
|---|---|---|
| WO | WO2008036676 | 3/2008 |
| WO | WO2009/056150 | 5/2009 |
| WO | WO2009151778 | 12/2009 |

OTHER PUBLICATIONS

Extended European Search Report for European Application No. EP10857771—Date of Completion of Search: May 26, 2014, 6 pages.

(Continued)

*Primary Examiner* — Nam Huynh
(74) *Attorney, Agent, or Firm* — Locke Lord LLP

(57) ABSTRACT

An exemplary method includes: obtaining I and Q complex signal parameters of signals received from a mobile tag at each of at least three antenna elements forming part of a positioning device; extracting an identifier modulated onto the signals received from the mobile tag; and transmitting the I and Q complex signal parameters and the identifier-to allow a position calculating device to calculate a bearing of the mobile tag from the positioning device, wherein transmitting the I and Q complex signal parameters and the identifier comprises the positioning device wirelessly broadcasting the I and Q complex signal parameters and the identifier. An exemplary apparatus and computer readable medium configured to perform the method are also disclosed.

16 Claims, 6 Drawing Sheets

(56) References Cited

U.S. PATENT DOCUMENTS

| | | |
|---|---|---|
| 2003/0114169 A1 | 6/2003 | Okamura et al. |
| 2003/0117320 A1 | 6/2003 | Kim et al. |
| 2007/0176749 A1 | 8/2007 | Boyd |
| 2009/0207694 A1* | 8/2009 | Guigne et al. ............... 367/127 |

OTHER PUBLICATIONS

International Search Report for International Application No. PCT/IB2010/054905—Date of Completion of Search: Jun. 16, 2011, 4 pages.

* cited by examiner

POSITIONING

FIELD OF THE INVENTION

This invention relates to positioning.

BACKGROUND TO THE INVENTION

There are a number of known techniques for determining the position of an apparatus using radio frequency signals. Some popular techniques relate to use of the Global Positioning System (GPS), in which multiple satellites orbiting Earth transmit radio frequency signals that enable a GPS receiver to determine its position. However, GPS is often not very effective in determining an accurate position indoors.

Some non-GPS positioning techniques enable an apparatus to determine its position indoors. However, many of these techniques do not result in an accurate position being determined, and others suffer from other disadvantages.

SUMMARY OF THE INVENTION

A first aspect of the invention provides a method comprising:
  obtaining complex signal parameters of signals received from a mobile tag at each of at least three antenna elements forming part of a positioning device;
  extracting an identifier modulated onto the signals received from the mobile tag; and
  transmitting the complex signal parameters and the identifier, thereby to allow a position calculating device to calculate a bearing of the mobile tag from the positioning device.

Obtaining complex signal parameters may comprise obtaining signal parameters of at least two different signals for each of the at least three antenna elements.

Obtaining complex signal parameters may comprise obtaining in-phase and quadrature samples of signals received at each of the at least three antenna elements.

Transmitting the complex signal parameters and the identifier may comprise the positioning device wirelessly broadcasting the samples and the identifier. Here, the method may comprise applying a predetermined delay between receiving the signals from the mobile tag and transmitting the complex signal parameters and the identifier.

Transmitting the complex signal parameters and the identifier may comprise the positioning device sending the complex signal parameters and the identifier to a server.

Transmitting the complex signal parameters and the identifier may comprise routing the complex signal parameters and the identifier from the positioning device to a beacon located proximal to the position calculating device via plural intermediaries.

The method may comprise encrypting the complex signal parameters and the identifier prior to transmitting.

A second aspect of the invention comprises a method comprising:
  a module of a mobile device receiving one or more data packets including:
    data representing complex signal parameters of signals transmitted by a mobile tag and received at each of at least three antenna elements forming part of a positioning device, and
    data representing an identifier transmitted by the mobile tag; and
  the module using the complex signal parameters data to calculate a bearing of the mobile tag from the positioning device.

The method may comprise the module using the bearing and information regarding a location and orientation of the positioning device to calculate a location of the mobile tag.

The method may comprise:
  the module receiving data representing complex signal parameters of signals transmitted by the mobile tag and received at each of at least three antenna elements forming part of a second positioning device, and
  the module using the complex signal parameters data to calculate a bearing of the mobile tag from the second positioning device; and
  the module using the bearings and information regarding a location and an orientation of each of the first and second positioning devices to calculate a location of the mobile tag.

The mobile tag may form part of the mobile device, and the method may comprise:
  the mobile tag transmitting a signal modulated with a code sequence; and
  the module using the code sequence to calculate the bearing.

A third aspect of the invention provides apparatus comprising:
  means for obtaining complex signal parameters of signals received from a mobile tag at each of at least three antenna elements forming part of a positioning device;
  means for extracting an identifier modulated onto the signals received from the mobile tag; and
  means for causing transmission of the complex signal parameters and the identifier, thereby to allow a position calculating device to calculate a bearing of the mobile tag from the positioning device.

The means for obtaining complex signal parameters may comprise means for obtaining signal parameters of at least two different signals for each of the at least three antenna elements.

The means for obtaining complex signal parameters may comprise means for obtaining in-phase and quadrature samples of signals received at each of the at least three antenna elements.

The means for transmitting the complex signal parameters and the identifier may comprise means in the positioning device for wirelessly broadcasting the samples and the identifier.

The apparatus may comprise means for applying a predetermined delay between receiving the signals from the mobile tag and transmitting the complex signal parameters and the identifier.

The means for transmitting the complex signal parameters and the identifier may comprise means in the positioning device for sending the complex signal parameters and the identifier to a server.

The means for transmitting the complex signal parameters and the identifier may comprise means for routing the complex signal parameters and the identifier from the positioning device to a beacon located proximal to the position calculating device via plural intermediaries.

The apparatus may comprise means for encrypting the complex signal parameters and the identifier prior to transmitting.

A positioning device may comprise apparatus as described above, the positioning device comprising at least three antenna elements and transmitter means for transmitting the samples and the identifier. Apparatus may comprising the positioning device, and a mobile device configured to receive the samples and the identifier transmitted by the positioning system and to use the to samples to calculate a bearing of the mobile tag from the positioning device.

A fourth aspect of the invention provides apparatus comprising:
 a module of a mobile device, the module comprising:
  means for receiving one or more data packets including:
   data representing complex signal parameters of signals transmitted by a mobile tag and received at at each of at least three antenna elements forming part of a positioning device, and
   data representing an identifier transmitted by the mobile tag; and
  means for using the complex signal parameters data to calculate a bearing of the mobile tag from the positioning device.

The module may comprise means for using the bearing and information regarding a location and orientation of the positioning device to calculate a location of the mobile tag.

Optionally, the module comprising means for receiving data representing complex signal parameters of signals transmitted by the mobile tag and received at at each of at least three antenna elements forming part of a second positioning device, and the module comprising means for using the complex signal parameters data to calculate a bearing of the mobile tag from the second positioning device; and the module comprising means for using the bearings and information regarding a location and an orientation of each of the first and second positioning devices to calculate a location of the mobile tag.

The mobile tag may form part of the mobile device, and the mobile tag may comprise means for transmitting a signal modulated with a code sequence; and the module may comprise means for using the code sequence to calculate the bearing.

A fifth aspect of the invention provides a computer program that when executed by computer apparatus controls it to perform the method described above.

A sixth aspect of the invention provides a computer readable medium comprising machine executable instructions that when executed by computing apparatus control it to perform a method comprising:
 obtaining complex signal parameters of signals received from a mobile tag at each of at least three antenna elements forming part of a positioning device;
 extracting an identifier modulated onto the signals received from the mobile tag; and
 transmitting the complex signal parameters and the identifier, thereby to allow a position calculating device to calculate a bearing of the mobile tag from the positioning device.

A seventh aspect of the invention provides a computer readable medium comprising machine executable instructions that when executed by computing apparatus control it to perform a method comprising:
 a module of a mobile device receiving one or more data packets including:
  data representing complex signal parameters of signals transmitted by a mobile tag and received at each of at least three antenna elements forming part of a positioning device, and
  data representing an identifier transmitted by the mobile tag; and
 the module using the complex signal parameters data to calculate a bearing of the mobile tag from the positioning device.

An eighth aspect of the invention provides apparatus configured to:
 obtain complex signal parameters of signals received from a mobile tag at each of at least three antenna elements forming part of a positioning device;
 extract an identifier modulated onto the signals received from the mobile tag; and
 cause transmission of the complex signal parameters and the identifier, thereby to allow a position calculating device to calculate a bearing of the mobile tag from the positioning device.

A ninth aspect of the invention provides apparatus comprising:
 a module of a mobile device, the module being configured:
  to receive one or more data packets including:
   data representing complex signal parameters of signals transmitted by a mobile tag and received at at each of at least three antenna elements forming part of a positioning device, and
   data representing an identifier transmitted by the mobile tag; and
  to use the complex signal parameters data to calculate a bearing of the mobile tag from the positioning device.

BRIEF DESCRIPTION OF THE DRAWINGS

For a better understanding of various embodiments of the present invention reference will now be made by way of example only to the accompanying drawings in which.

DETAILED DESCRIPTION OF EMBODIMENTS OF THE INVENTION

Figure 1:
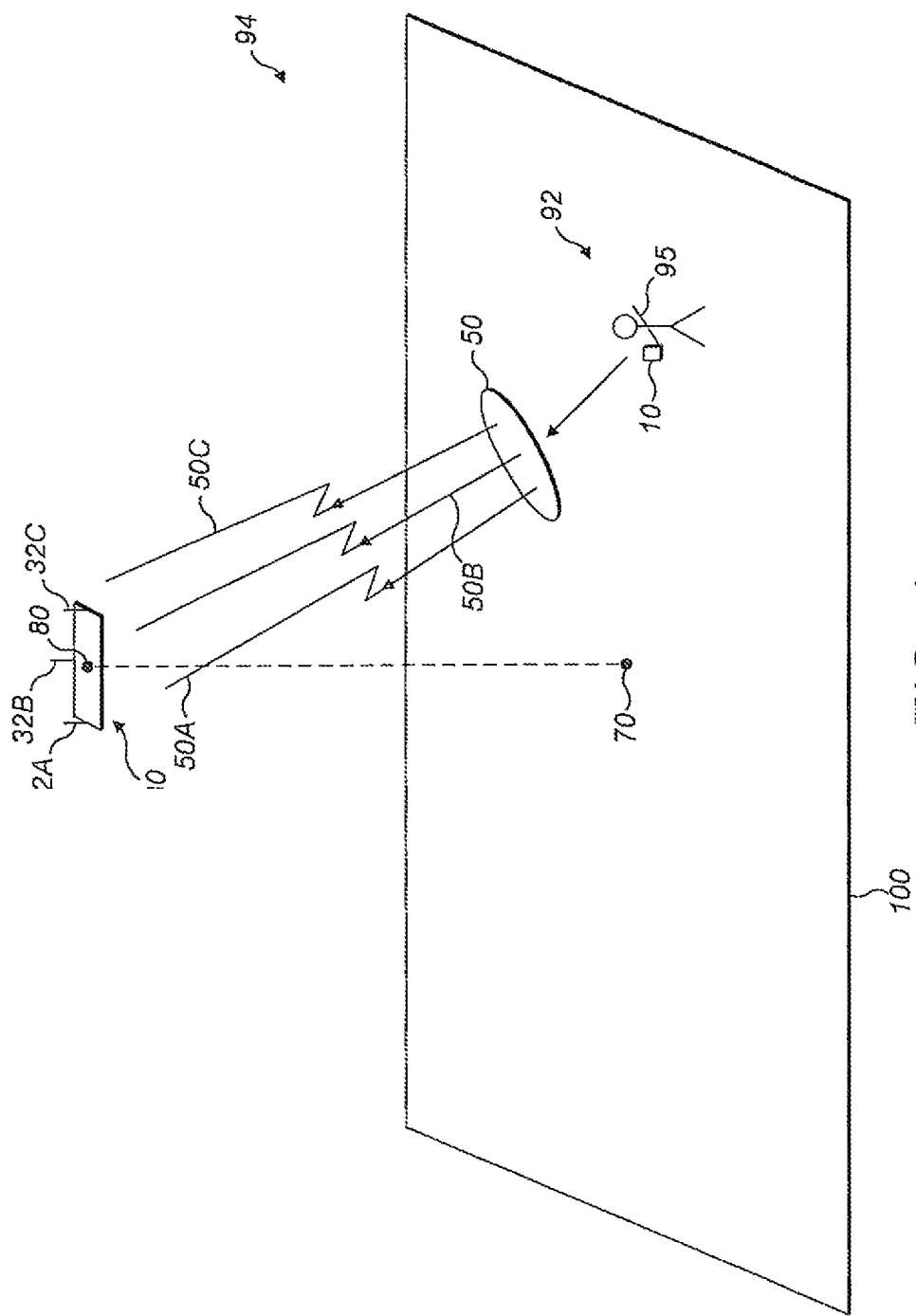
FIG. 1 illustrates an apparatus according to aspects of the invention receiving radio signals from a transmitter according to other aspects of the invention.

FIG. 1 illustrates a person 92 (carrying a mobile radio communications apparatus 10) at a position 95 on a floor 100 of a building 94. The building 94 could be, for example, a shopping centre or a conference centre.

A base station receiver apparatus 30 is positioned at a location 80 of the building 94. In the illustrated example, the location 80 is on the ceiling of the building 94 (i.e. the overhead interior surface) but in other implementations the receiver may be placed elsewhere, such as on a wall or within an under-floor cavity. For reasons that will become apparent, the base station receiver apparatus 30 can be termed a positioning receiver.

The location 80 is directly above the point denoted with the reference numeral 70 on the floor 100 of the building. The receiver apparatus 30 is for enabling the position of the apparatus 10 to be determined, although that is not necessarily the only function provided by the receiver apparatus 30. For example, the receiver apparatus 30 may be part of a transceiver for providing wireless internet access to users of apparatuses 10, for example, via Bluetooth Low Energy protocol signals or wireless local area network (WLAN) radio signals.

Briefly, the mobile device 10 transmits signals which are received at the base station receiver apparatus 30. The mobile device 10 is operable to transmit radio signals that are receivable by the base station 30, for instance Bluetooth Low Energy protocol signals. The base station receiver apparatus 30 takes I and Q samples, and transmits them to the mobile device 10. The mobile device 10 then uses the received samples to estimate a bearing of the device 10 from the base station receiver apparatus 30. From the bearing, the mobile device 10 may calculate its location. Alternatively, a mobile tag other than the mobile device 10 may transmit signals which are received by the base station receiver apparatus 30, and the mobile device may use I and Q samples of these signals to calculate a bearing of the mobile tag from the base station receiver apparatus 30. Here, the mobile tag 10 may be absent of a receiver. A mobile tag is absent of voice communication capability, and may also be absent of a display and audio transducers.

The position 95 of the person 92 is defined by specifying a position along a bearing 82 (illustrated in FIG. 5) which runs from the location 80 of the receiver apparatus 30 through the location 95 of the apparatus 10. The bearing 82 is defined by an elevation angle θ and an azimuth angle φ.

The mobile apparatus 10 may, for example, be a hand portable electronic device such as a mobile radiotelephone. The apparatus 10 may transmit radio signals 50 periodically as beacons.

The radio signals may, for example, have a transmission range of 100 meters or less. For example, the radio signals may be 802.11 wireless local area network (WLAN) signals, Bluetooth signals, Ultra wideband (UWB) signals or Zigbee signals.

Figure 2:
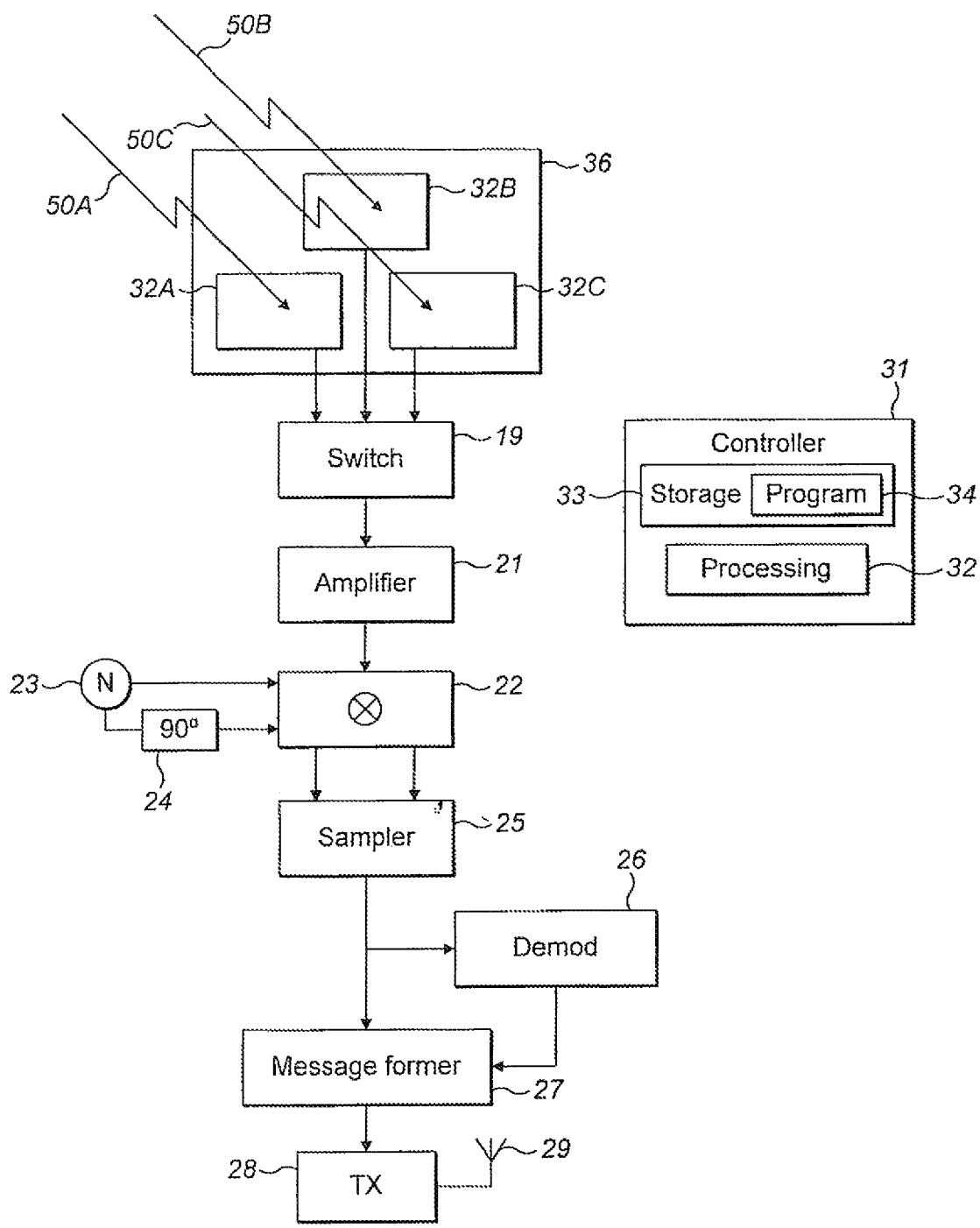
FIG. 2 is a schematic diagram of a receiver apparatus according to aspects of the invention.

FIG. 2 schematically illustrates one example of the base station receiver apparatus 30. The receiver apparatus 30 comprises an antenna array 36 comprising a plurality of antenna elements 32A, 32B, 32C which receive respective radio signals 50A, 50B, 50C transmitted from the mobile apparatus 10. Although three antenna elements are shown, three is the minimum and the embodiments described here may include more.

Each of the plurality of antenna elements 32A, 32B, 32C is connected to an switch 19, which is controllable by a controller 31 as described below. The switch 19 is controlled so that only one of the antenna elements 32A, 32B, 32C is connected to an amplifier 21 at a given time. The output of the amplifier 21 are received at a mixer arrangement 22. This is provided with in-phase (I) and quadrature (Q) signals by an arrangement of a local oscillator 23, which may be analogue or digital, and a 90° phase shifter 24. A sampler 25 is configured to receive I and Q output signals from the mixer arrangement and take digital samples thereof. The sampler 25 may take any suitable form, for instance including two digital to analogue converter (DAC) channels, one for the I channel and one for the Q channel. The effect of the mixer arrangement 24 and the sampler 25 is to downconvert the received signals and to provide digital I and Q samples of the downmixed signals.

An output of the sampler 25 is provided to both a demodulator 26 and a message former 27. The demodulator 26 is configured to demodulate data modulated onto signals received by the antenna elements 32A, 32B, 32C and extract therefrom an identifier relating to a mobile tag that transmitted the received signals. This identifier is provided to the message former 27.

A controller 31 is configured to control the other components of the base station apparatus 30. The controller may take any suitable form. For instance, it may comprise processing circuitry 32, including one or more processors, and a storage device 33, comprising a single memory unit or a plurality of memory units. The storage device 33 may store computer program instructions 34 that, when loaded into processing circuitry 32, control the operation of the base station 30. The computer program instructions 34 may provide the logic and routines that enables the apparatus to perform the functionality described above. The message former 27 may be comprised solely of the controller 31. The computer program instructions 34 may arrive at the apparatus 30 via an electromagnetic carrier signal or be copied from a physical entity 21 such as a computer program product, a memory device or a record medium such as a CD-ROM or DVD.

The processing circuitry 32 may be any type of processing circuitry. For example, the processing circuitry 32 may be a programmable processor that interprets computer program instructions 34 and processes data. The processing circuitry 32 may include plural programmable processors. Alternatively, the processing circuitry 32 may be, for example, programmable hardware with embedded firmware. The processing circuitry 32 may be a single integrated circuit or a set of integrated circuits (i.e. a chipset). The processing circuitry 32 may also be a hardwired, application-specific integrated circuit (ASIC). The processing circuitry may be termed processing means.

The processing circuitry 32 is connected to write to and read from the storage device 33. The storage device 33 may be a single memory unit or a plurality of memory units.

The controller 31 operates to control the switch 19 to connect the antenna elements 32A, 32B, 32C to the amplifier 21 in turn. The controller 31 controls the switch 19 to connect one of the antenna elements 32A, 32B, 32C to the amplifier for the duration of transmission of the header of a packet transmitted by the mobile device 10. After the header has been received, the controller 31 controls the switch 19 to connect different one of the antenna elements 32A, 32B, 32C to the LNA 21 in a sequence. The interval between successive switching of the switch 19 is approximately equal to the symbol rate used in the payload of the transmitted packets.

The message former 27 generates a message comprising I and Q samples of the downconverted signals from each of the antenna elements 32A, 32B, 32C and the identifier. The message is then passed to a transmitter 28, from where it is transmitted via an antenna 29. The antenna 29 may alternatively be constituted by one or more of the antenna elements 32A, 32B, 32C. The message advantageously is broadcast such that it can be received by the mobile telephone 10.

The message may include plural packets, each including a header and a payload. The headers of the packets include an identifier relating to and identifying the base station receiver apparatus 30. The payloads include the I and Q samples and the identifier demodulated from the signals received by the base station receiver apparatus 30. The I and Q samples and identifier relating to one signal received at the base station receiver apparatus 30 may be included in one packet, or split across multiple packets. One packet may include I and Q samples and identifiers relating to two or more signals received at the base station receiver apparatus 30, although advantageously each packet relates to only one signal.

In a prototype system constructed by the inventors, sixteen antenna elements 32A are used. In this system, each antenna element is sampled twice although one antenna element (a reference element) is sampled more frequently. Performing three measurements results in 104 samples which, with one byte for each I and Q sample, totals 208 bytes of data. These bytes are included in the message.

The I and Q samples constitute complex signal parameters in that the I and Q samples together define parameters of a complex signal.

Instead of transmitting 'raw' I and Q samples, the controller 31 may process the I and Q samples to provide other complex signal parameters relating to the received signals, from which bearing calculation can be performed. For instance, the controller 31 may provide averaging of the I and Q samples in the angle/phase domain before converting the averages back to the I and Q domain (one sample for each antenna) and providing the averaged samples as complex signal parameters.

Alternatively, the controller 31 may calculate amplitude and/or phase information from the I and Q samples, and provide the amplitude, phase or phase and amplitude information as complex signal parameters Whatever form is taken by the complex signal parameters, they are included in a message as described above.

The message is transmitted wirelessly, for instance using radio signals. The radio signals may have a transmission range of 100 meters or less. For example, the radio frequency signals may be 802.11 wireless local area network (WLAN) signals, Bluetooth or Bluetooth Low Energy signals, Ultra wideband (UWB) signals or Zigbee signals.

Figure 3:
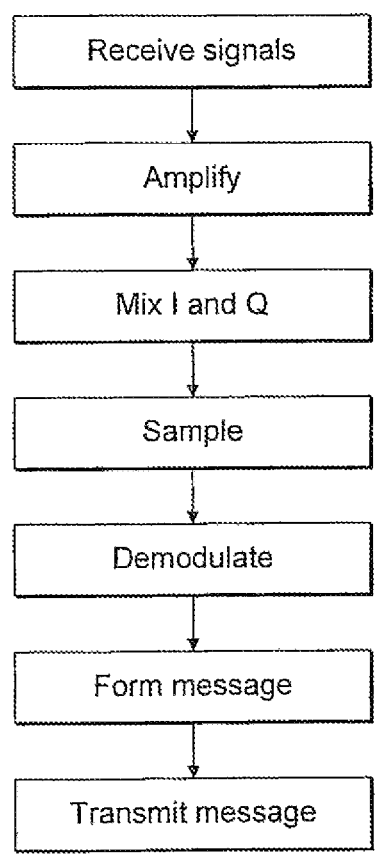
FIG. 3 is a flow chart illustrating operation of the FIG. 2 receiver apparatus according to aspects of the invention.

Operation of the base station 30 is illustrated in the flow chart of FIG. 3.

The message is received at the receiver apparatus 10.

Figure 4:
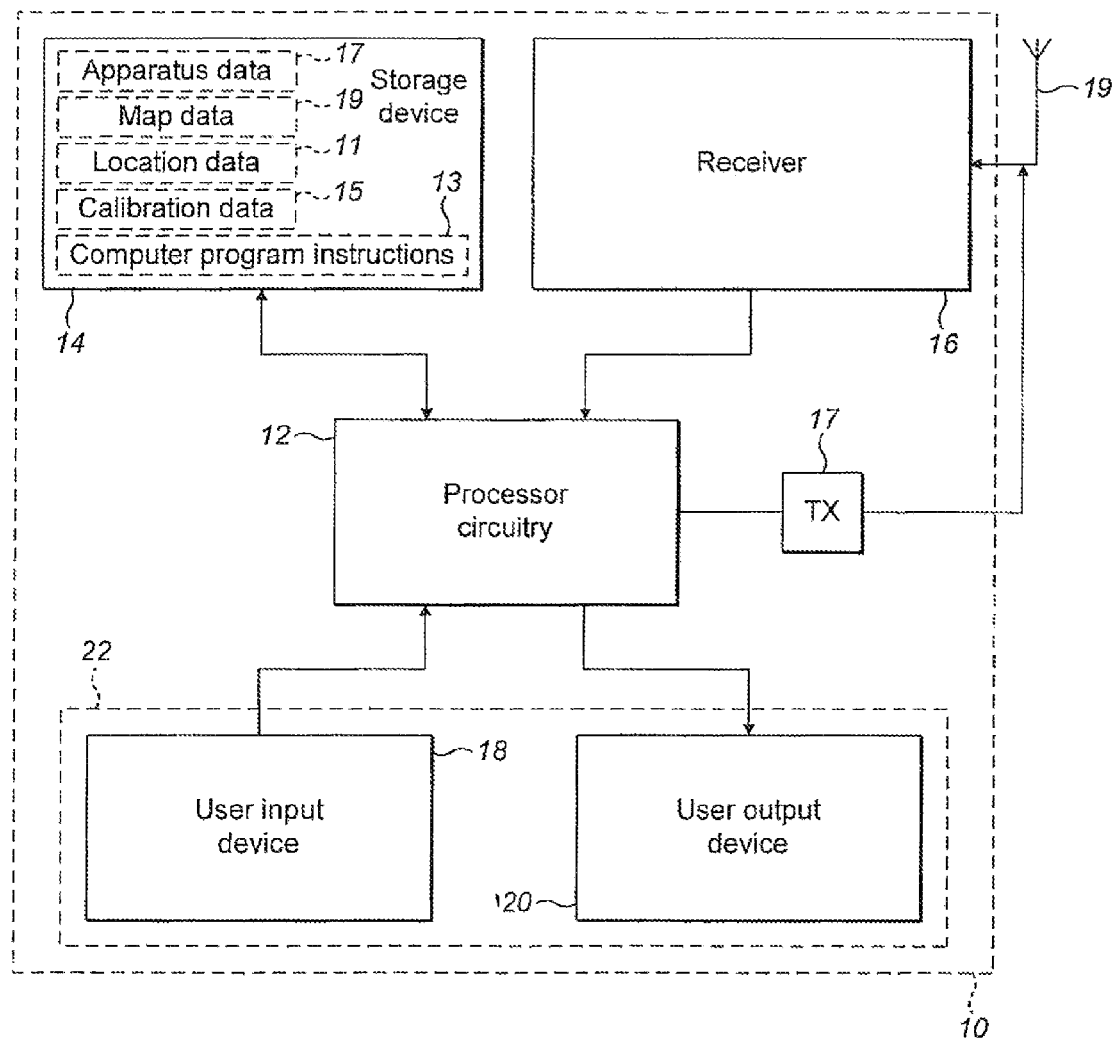
FIG. 4 is a schematic diagram of a mobile device according to aspects of the invention.

FIG. 4 illustrates a schematic of a receiver apparatus 10. The apparatus 10 may, for example, be a hand portable electronic device such as a mobile radiotelephone. The apparatus 10 comprises, amongst other components, processing circuitry 12, a storage device 14, a receiver 16, a user input device 18 and a user output device 20. The apparatus 10 also includes a transmitter 17. The receiver 16 and the transmitter 17 are commonly connected to an antenna 19.

The processing circuitry 12 operates to process received complex signal parameters, which in the following are assumed to be I and Q samples, to estimate a bearing to the mobile device 10 from the base station receiver apparatus 30 and estimate, using the bearing, a position of the apparatus 10. Estimation of the position of the apparatus may involve using constraint information that is independent of the radio signals 50. The estimation may involve determining the position of the apparatus 10 along the bearing 82. Alternatively or in addition it may involve using I and Q samples generated by plural base station receiver apparatuses 30 and using triangulation to determine the location of the mobile device 10.

In this example, the portable apparatus 10 constitutes a mobile tag and estimates its own location. In other embodiments, described below, the portable apparatus 10 estimates the location of one or more mobile tags that are associated with the mobile device 10 but may be remote from the mobile device. The mobile device 10 itself does not need to transmit to determine its position.

The processing circuitry 12 may be any type of processing circuitry. For example, the processing circuitry 12 may be a programmable processor that interprets computer program instructions 13 and processes data. The processing circuitry 12 may include plural programmable processors. Alternatively, the processing circuitry 12 may be, for example, programmable hardware with embedded firmware. The processing circuitry 12 may be a single integrated circuit or a set of integrated circuits (i.e. a chipset). The processing circuitry 12 may also be a hardwired, application-specific integrated circuit (ASIC). The processing circuitry may be termed processing means.

It will be appreciated by those skilled in the art that, for clarity, the processing circuitry is described as being a separate entity to the receiver. However, it will be understood that the term processing circuitry may relate not only to a main processor of an apparatus, but also processing circuitry included in a dedicated receiver chip set, and even to a combination of processing circuitry included in a main processor and a dedicated receiver chipset.

A chipset for performing functions attributed to the mobile device 10 may be incorporated within a module. Such a module may be integrated within the apparatus 10, and/or may be separable from the mobile device 10.

The processing circuitry 12 is connected to receive an input from the receiver 16. The receiver 16 is configured to receive radio frequency signals, including those incorporating the message transmitted by the base station receiver apparatus 30.

The processing circuitry 12 is connected to write to and read from the storage device 14. The storage device 14 may be a single memory unit or a plurality of memory units.

The storage device 14 may store computer program instructions 13 that, when loaded into processing circuitry 12, control the operation of the apparatus 10. The computer program instructions 13 may provide the logic and routines that enables the apparatus to perform the method illustrated in FIG. 5.

The computer program instructions 13 may arrive at the apparatus 10 via an electromagnetic carrier signal or be copied from a physical entity 21 such as a computer program product, a memory device or a record medium such as a CD-ROM or DVD.

The computer program instructions 13 provide instructions for processing data representing in-phase and quadrature samples of signals transmitted by a mobile tag and received at each of the antenna elements 32A, 32B, 32C forming part of the base station receiver apparatus 30 and to calculate therefrom a bearing of the mobile tag from the positioning device.

The processing circuitry 12 is connected to receive an input from the user input device 18. The processing circuitry 12 is also connected to provide an output to the user output device 20. The user output device 20 is for conveying information to a user and may be, for example, a display device.

The user input device 18 and the user output device 20 together form part of a user interface 22. The user interface 22 may be provided as a single unit, such as a touch screen display device. The user interface also comprises software, which may or may not be integrated with an operating system controlling the mobile device 10.

The mobile device 10 operates to obtain 'displacement information' from the signals 50A, 50B, 50C, as represented by the complex parameters included in the message sent from the base station 30, that is dependent upon inter alia the relative displacements of the respective antenna elements 32A, 32B, 32C. In the example described in detail here, the displacement information includes phase information.

The processing circuitry demodulates the sampled I and Q waveform using I-Q modulation, also known as quadrature phase shift modulation. In this demodulation technique, the complex samples reflect the amplitude of the two orthogonal carrier waves. The processing circuitry 12 processes the complex samples to determine the closest matching symbol. It should be appreciated that an identical signal received at different antenna elements are received with different phases and amplitudes because of the inherent phase characteristics of the antenna elements 32 when receiving from different directions and also because of the different times of flight for a signal 50 to each antenna element 32 from the transmitter apparatus 10. The inherent presence of this 'time of flight' information within the phases of the received signals 50 enables the received signals 50 to be processed, as described in more detail below, to determine the bearing 82 of the transmitter apparatus 10 from the receiver apparatus 30.

Figure 5:
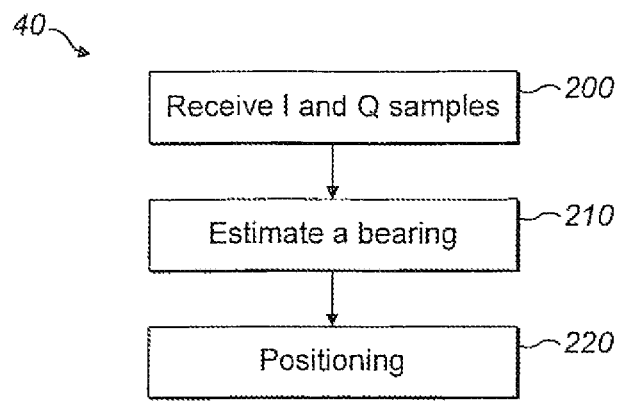
FIG. 5 is a flow diagram of a method of estimating a position according to aspects of the invention.

FIG. 5 illustrates a method for estimating the position of the apparatus 10. Various embodiments of the method of FIG. 5 will be described hereinafter.

The respective spatially diverse received radio signals 50A, 50B, 50C are received at the receiver apparatus 30 as illustrated in FIGS. 1 and 2. At block 200 of the method of FIG. 4, the mobile device 10 receives the message containing I and Q samples of first, second and third radio signals 50A, 50B, 50C incident on the base station 30.

At block 210, the processing circuitry 12 uses the I and Q samples to estimate a bearing 82 of the apparatus 10 from location 80 of the base station receiver apparatus 30. One method of determining the bearing 82 is now described, but other methods are possible.

Once complex samples from each antenna element 32 are obtained, the array output vector y(n) (also called as snapshot) can be formed at by the processor 12:

$$y(n)=[x_1, x_2 \ldots, x_M] \quad (1)$$

Where $x_i$ is the complex signal received from the ith antenna element 32, n is the index of the measurement and M is the number of elements 32 in the array 36.

An Angle of Arrival (AoA) can be estimated from the measured snapshots if the complex array transfer function $a(\phi,\theta)$ of the RX array 36 is known, which it is from calibration data.

The simplest way to estimate putative AoAs is to use beamforming, i.e. calculate received power related to all possible AoAs. The well known formula for the conventional beamformer is $$P_{BF}(\phi,\theta) = a^*(\phi,\theta) \check{R} a(\phi,\theta) \quad (2)$$

Where, $$\check{R} = \frac{1}{N} \sum_{n=1}^{N} y(n) y*(n)$$

is the sample estimate of the covariance matrix of the received signals, $a(\phi,\theta)$ is the array transfer function related to the DoD$(\phi,\theta)$ $\phi$ is the azimuth angle and $\theta$ is the elevation angle.

Once the output power of the beamformer $P_{BF}(\phi,\theta)$ is calculated in all possible AoAs, the combination of azimuth and elevation angles with the highest output power is selected to be the bearing 82.

The performance of the system depends on the properties of the array 36.

For example the array transfer functions $a(\phi,\theta)$ related to different AoAs should have as low correlation as possible for obtaining unambiguous results.

Correlation depends on the individual radiation patterns of the antenna elements 32, inter element distances and array geometry. Also the number of array elements 32A, 32B, 32C has an effect on performance. The more elements 32A, 32B, 32C the array 36 has the more accurate the bearing estimation becomes. In minimum there are at least 3 antenna elements 32A, 32B, 32C in planar array configurations but in practice or more elements provide better performance.

Next, at block 220 the processor 12 estimates a position of the apparatus 10. This may involve the processor 12 estimating a position of the apparatus using the bearing and constraint information. The use of constraint information enables the processor 12 to determine the location of the apparatus 10 along the estimated bearing 82.

Figure 6:
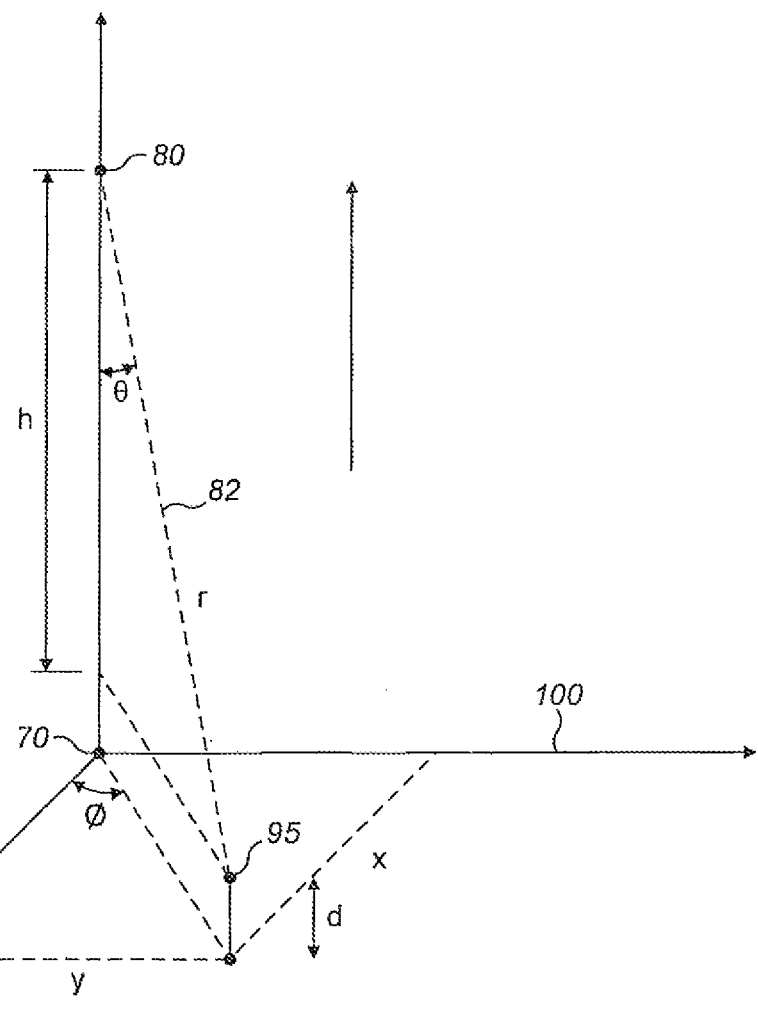
FIG. 6 illustrates estimating the position using a displacement or range as a constraint.

FIG. 6 also illustrates the bearing 82 from the location 80 of the receiver apparatus 30 to the location 95 of the transmitter apparatus 10, which has been estimated by the processor 12 following reception of the radio signals 50. The bearing 82 is defined by an elevation angle $\theta$ and an azimuth angle $\phi$.

The processor 12 may estimate the position of the apparatus 10 relative to the location 80 of the receiver apparatus 30 in coordinates using the bearing (elevation angle $\theta$ and azimuth angle $\phi$) and constraint information e.g. vertical displacement h (FIG. 6) or an additional bearing or a range r. The processor 12 may estimate the position of the apparatus 10 in Cartesian coordinates by converting the coordinates using trigonometric functions.

Using information identifying the location and orientation of the base station 30, the mobile device 10 can calculate its absolute location from the bearing and the constraint information. The information identifying the location and orientation of the base station 30 may be received at the mobile device 10 in any suitable way. For instance, it may be broadcast directly by the base station 30. Broadcast may occur periodically, or the information may be broadcast along with or as part of the message that carries the I and Q samples. Alternatively, the information identifying the location and orientation of the base station 30 may be obtained by the mobile device by accessing a database, for instance using a browser application or using another query and response technique.

Alternatively, block 220 may involve triangulating from two base stations 30. In this case, constraint information is not required, although the use of constraint information is not precluded. In this alternative, block 200 involves receiving messages from two base stations 30. Each message relates to the mobile device 10, as is determined by the mobile device 10 from the identifier that is included in the messages by the base stations 30. Block 210 is performed for each of the base stations, providing two bearings. Block 220 involves the mobile device 10 using information identifying the location and orientation of both of the base stations 30 and the bearings therefrom to calculate its absolute location through triangulation.

The above described system allows a mobile device 10 to calculate its location without access to GPS or other satellite based system. Moreover, this is achieved with a relatively simple infrastructure which in its simplest form comprises a multi-antenna receiver, a signal sampling means and a sample transmission means, i.e. without any substantial processing on the infrastructure side of the system. Additionally, with relatively modest system constraints, the position so calculated can be considerably more accurate than locations provided by other such systems.

Figure 7:
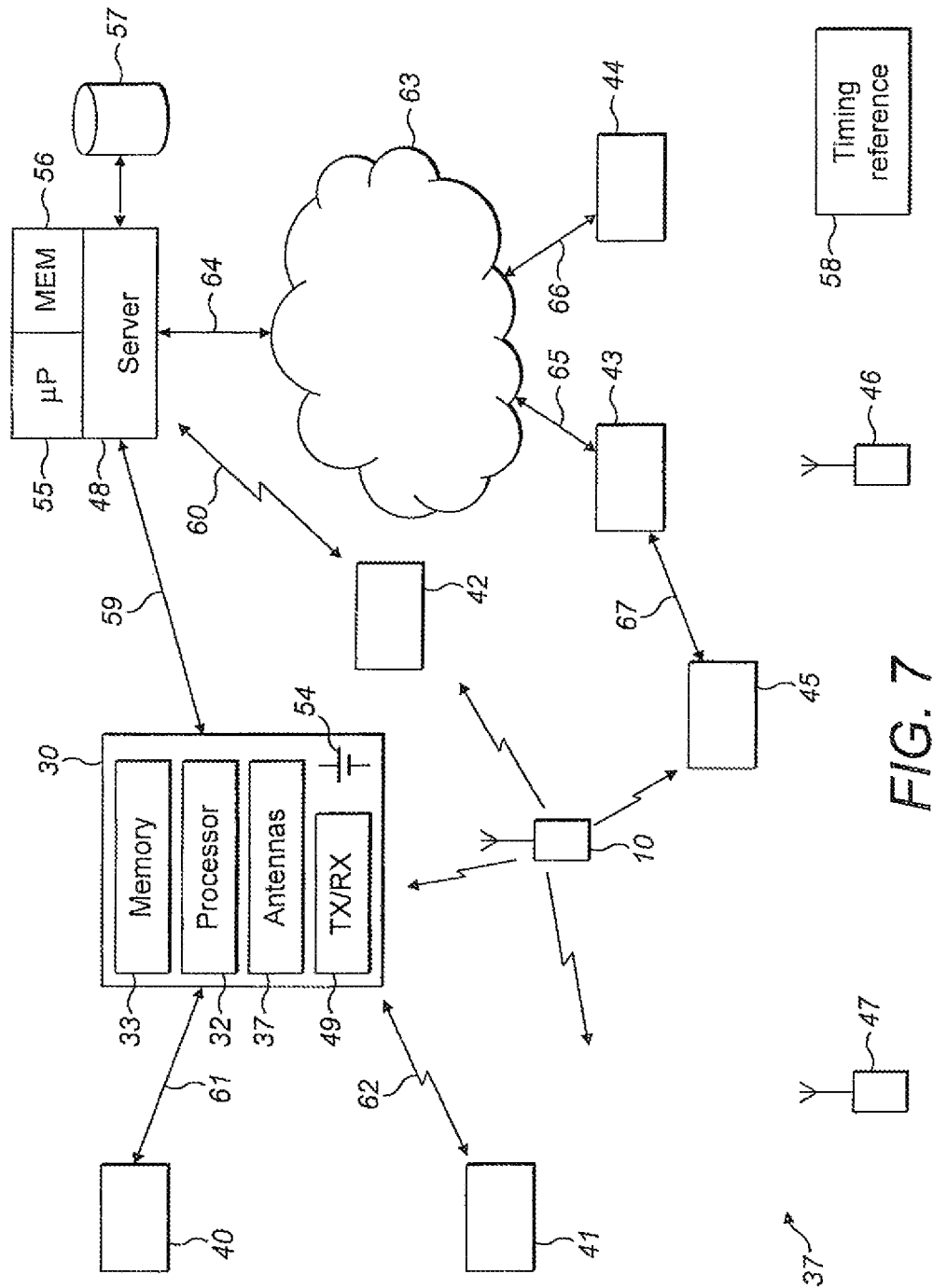
FIG. 7 is a schematic diagram of a system incorporating the FIGS. 2 and 4.

FIG. 7 is a schematic diagram illustrating a system 37 including the base station 30 and the mobile device 10. The base station 30 is a first base station in a plurality of base stations, second to seventh ones of which are labelled at 40 to 45 respectively. The mobile device 10 is a first mobile device amongst a plurality of devices, second and third ones of which are illustrated at 46 and 47 respectively. A server 48 is connected either directly or indirectly to each of the plural base stations 30, 40 to 45.

The first to seventh base stations 30, 40 to 45 are provided at various locations around a zone of interest. The zone of interest may, for example, be an office building or a shopping centre, as discussed above. The distribution of the base stations around the zone of interest allows the locations of mobile devices 10, 46, 47 within the zone of interest to be determined.

The first to seventh base stations 30, 40 to 45 are the same as one another, unless otherwise stated. Some components of the first base station 30 are shown in FIG. 7, and it will be appreciated that these are included also in the other base stations but are omitted from the Figure for the sake of clarity. The first base station 30 is shown as including antennas 38, a transmitter/receiver interface 49, which may include the transmitter 28 of FIG. 2, one or more memories 33 and one or more processors 32. The first base station 30 also includes a power supply 54, which is shown as a battery in FIG. 7, although it may alternatively be a connection to a mains power supply for instance.

The server 48 constitutes computing apparatus. The server 48 includes one or more processors 55 and one or more memories 56. The server 48 also is connected to a database 57, which may be internal to the server 48 or may be external. The server 48 is so-called because it has processing resources that exceed the resources of other components of the system 37, by a significant degree.

The system 37 also includes a timing reference 58, which may take any suitable form. The timing reference 58 provides a source of reference time to various components of the system 37, including the base stations 30, 40 to 45 and the server 48. The timing reference 58 may also provide reference time to the mobile devices 10, 46, 47.

FIG. 7 illustrates alternative ways in which the plurality of base stations may be connected to the server 48. Some base stations may be connected directly to the server by wired links, for instance Ethernet links. The first base station 30 is shown as being connected directly to the server 48 by a first wired link 59. Other ones of the plurality of base stations 42 are connected directly to the server 48 by wireless links. The fourth base station 42 is shown as connected to the server 48 by a first wireless link 60. Other base stations are connected to the server 48 by an intermediary. In the Figure, the second base station 40 is shown as connected to the server 48 by way of a second wired link 61 to the first base station and the first wired link 59 between the first base station 30 and the server 48. When acting as a router, a computer program (not shown) stored in the memory 33 of the first base station 30 is executed by the processor 32 in such a way as to control the transmitter/receiver interface 49 to receive packets and to retransmit them. The first and second wired links 59, 61 are bidirectional, and the first base station 30 is operable to route packets both from the second base station 40 to the server 48 and from the server 48 to the second base station 40.

An indirect link between a base station and the server 48 may involve links of different types. For instance, the third base station 41 is connected to the server 48 by a second wireless link 62 between the third base station 41 and the first base station 30 and by way of the first wired link 59 between the first base station 30 and the server 48. When acting as a router between the third base station 41 and the server 48, a computer program (not shown) stored in the memory 52 of the first base station 30 is executed by the processor 52 to control the transmitter/receiver interface 49 to receive wireless packets from the second base station, convert protocol as necessary and transmit packets on the first wired link 59 to the server 48. The first base station 30 also is operable to receive packets from the server 48 via the first wired link 59 and to forward them as wireless packets via the second wireless link 62 to the second base station 41.

The first base station 30, as well as any other base station that serves to route packets, routes packets by detecting a destination address in a packet header, deciding on a route using predefined rules that are stored in the base station and passing the packet externally via its transmitter/receiver interface 49.

Base stations may be connected to the server 48 via an intermediary network, rather than being connected directly or indirectly via other base stations. For instance, as shown in FIG. 7 the fifth to seventh base station 43 to 45 are connected to the server 48 by an intermediary network 63. The network may be an Internet protocol (IP) network, for instance the Internet or an intranet. A third wired link 64 between the server 48 and the network 63 allows communication between the server 48 and the fifth and sixth base stations 43, 44 by virtue of fourth and fifth wired connections 65, 66 between the base stations 43 and 44 and the network 63. The seventh base station 45 is connected to the network 63 by way of a sixth wired link 67 to the fifth base station 43, which acts as a router between the seventh base station 45 and the network 63.

The connection of the server 48 to the fifth to seventh base stations 43 to 45 via the network 63 allows the server 48 to be located remote from the base stations. For instance, the server 48 could be located at premises of a positioning service provider, and may be in a different country or even on a different continent to the base stations 43 to 45. Packets are able to be passed between the server 48 and the fifth to seventh base stations 43 to 45 by way of routing enabled by destination address information included in packet headers.

Since the first to seventh base stations 30, 40 to 45 are located in the same zone of interest, a mobile device, such as the first mobile device 10, may be within range of a number of the base stations. In FIG. 7, transmissions of the first mobile device 10 are illustrated to be receivable by the first, third, fourth and seventh base stations 30, 41, 42 and 45. However, the strength of signals received at the base stations from the first mobile device 10 depends on a distance of the first mobile device and the respective base station 30, 41, 42, 45, the bearing between the first mobile device 10 and the base station and the nature of any obstacles in the line of sight between the mobile device and the base station. Assuming that the base stations 30, 41, 42, 45 receive the same transmission of the first mobile device 10, the strength of the signal received is likely to be different for each base station. The strength of the signal may be represented, for instance by a measure of signal power.

The above description concentrates on the situation where the mobile device 10 calculates its own position. However, the invention is applicable also to embodiments in which a mobile device 10 is configured to calculate the position of a mobile tag that is remote from the mobile device 10. For instance, the mobile device 10 may be configured to calculate the position of the second mobile device 46, or the third mobile device 47. These embodiments have numerous possible applications. For instance, the second and third mobile devices 46, 47 may be devices that are carried by children of a person carrying the first mobile device 10. These embodiments allow the user of the first mobile device 10 to determine the locations of their children, as determined by the locations of the second and third mobile devices 46, 47, within the zone of interest. It is not necessary for the second and third mobile devices 46, 47 to include receiver capability; their position can be determined even if the devices only have transmit capability. The second and third mobile devices 46, 47 will be referred to hereafter as first and second mobile tags.

Each of the first and second mobile tags 46, 47 transmits signals including a respective identifier. The signals are received by nearby base stations 30, 40 to 45, and are processed as described above in particular by sampling the received signals and providing I and Q samples along with the identifier in a message. The message then is forwarded to the first mobile device 10, so that it can perform calculations necessary to determine the positions of the first and second mobile tags 46, 47. Forwarding may occur in any suitable way.

For instance, messages formed by base stations 30, 40 to 45 may be forwarded to the server 48, which may then pass the messages on to the first mobile device 10. In one alternative, the server 48 stores received messages and responds to a request for messages relating to a particular mobile tag, 46, 47 by forwarding the messages to the sender of the request. In this way, the first mobile device 10 can obtain messages relating to the first mobile tag 46 by sending a request to the server 48 and by processing a reply received from the server. Alternatively, the server 48 may instruct all of the base stations 30, 40 to 45 to broadcast the message. In this way, all mobile devices, including the first mobile device 10, within receiving range of one of the base stations 30, 40 to 45 is able to receive the message. Mobile devices that receive the message may be arranged to examine the identifier forming part of the message, and relating to the first mobile tag 46, and to determine based on the identifier whether or not to process the received message to calculate the position of the first mobile tag 46. If the message is encrypted or otherwise obscured, so that mobile devices other than the first mobile device 10 (which is provided with the relevant encryption key or other means necessary for de-obscuring the message) are unable to calculate the position of the first mobile tag 46. In another alternative, the server 48 is aware of the location of the first mobile device 10 and is configured to route the message for broadcast only by the one of the base stations 30, 40 to 45 that is closest to the first mobile device 10.

In alternative embodiments, the system 37 is absent of the server 48. In these embodiments, the message prepared by a base station 30, 40 to 45 receiving transmissions from the first mobile tag 46 broadcasts the message so that it can be received by other base stations within receiving range of the base station 45. Here, each of the base stations 30, 40 to 45 is configured to listen for broadcast of other base stations and to rebroadcast messages received in such broadcasts. In this way, messages are propagated throughout the arrangement of base stations 30, 40 to 45. In these embodiments, it is advantageous if a message created by a base station is provided with an identifier that is unique or pseudo-unique to that message. In this way, other base stations can check that the base station has not already broadcast a message having the same identifier, and refrain from re-broadcasting if it is determined that a message with that identifier already has been broadcast by that base station. This can prevent looping of messages throughout the system 37.

If the spacing between adjacent base stations 30 to 45 and the transmit power of the base stations is such that base stations can correctly receive transmissions of base stations that are not immediately adjacent, the system 37 may be configured such that not all of the base stations are configured to re-broadcast messages received from other base stations. In these embodiments, some of the base stations 30, 40 to 45 are designated as re-broadcast base stations and the remaining base stations are designated as passive base stations. In these embodiments, only the re-broadcast base stations re-broadcast messages received from other base stations. Passive base stations are configured to create messages using signals received from mobile devices but are configured not to re-broadcast messages received from other base stations. The number of transmissions and broadcasts can thus be reduced compared to the system in which all of the base stations re-broadcast received messages.

In alternative embodiments, mobile devices, such as the third mobile device 47, are used as part of an ad-hoc network to forward messages from a base station to a mobile device. This allows the passive base stations to be simpler in their construction, for instance allowing them to have lower connectivity requirements than the other base stations. This may be particularly important where the provision of wired links between a base station 30, 40 to 45 and infrastructure of the system 37, for instance the server 48, may be relatively difficult and/or expensive.

In some embodiments, the first and second mobile tags 46, 47 are provided with a code, that is known also by the first mobile device 10. The first and second mobile tags 46, 47 here are configured to modulate the code into their transmissions. In this way, the position of the mobile tags 46, 47 can only be calculated from the I and Q samples that are made by receiving base stations 30, 40 to 45 by a device that is aware of the code. This means that the first mobile device 10 can calculate the positions of the first and second mobile tags 46, 47 but that the locations cannot be calculated by other mobile devices, or indeed by any other device. This, therefore, provides enhanced privacy.

In embodiments in which the base stations 30, 40 to 45 encrypt messages before broadcast or other transmission, access to the keys needed to decrypt the messages could be subject to payment of a fee or a subscription. In this way, an operator of the system 37 is able to derive revenue for use of the system 37. Alternatively or in addition, where messages are collated by the server 48, broadcast or transmission of the messages to the mobile device 10 may be subject to payment of a fee or a subscription, providing revenue to an operator of the system 37.

Although the memory 14 and the memory 33 are illustrated as single components, they may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialised circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed function device, gate array or programmable logic device etc.

The invention claimed is:
1. A method comprising:
  obtaining in-phase and quadrature (I and Q) complex signal parameters of signals received from a mobile tag at each of at least three antenna elements forming part of a positioning device;
  extracting an identifier modulated onto the signals received from the mobile tag; and
  transmitting the I and Q complex signal parameters and the identifier, thereby to allow a position calculating device to calculate a bearing of the mobile tag from the positioning device:
wherein transmitting the I and Q complex signal parameters and the identifier comprises the positioning device wirelessly broadcasting the I and Q complex signal parameters and the identifier.

2. A method as claimed in claim 1, wherein obtaining I and Q complex signal parameters comprises obtaining one of:
a) signal parameters of at least two different signals for each of the at least three antenna elements; or
b) in-phase and quadrature samples of signals received at each of the at least three antenna elements.

3. A method as claimed in claim 1, comprising applying a predetermined delay between receiving the signals from the mobile tag and transmitting the complex signal parameters and the identifier.

4. A method as claimed in claim 1, wherein transmitting the I and Q complex signal parameters and the identifier comprises one of:
a) the positioning device sending the I and Q complex signal parameters and the identifier to a server; or
b) routing the I and Q complex signal parameters and the identifier from the positioning device to a beacon located proximal to the position calculating device via plural intermediaries.

5. A method as claimed in claim 1, comprising encrypting the I and Q complex signal parameters and the identifier prior to transmitting.

6. A method comprising:
a module of a mobile device receiving one or more data packets including:
data representing in-phase and quadrature (I and Q) complex signal parameters of signals transmitted by a mobile tag and received at each of at least three antenna elements forming part of a positioning device, and
data representing an identifier transmitted by the mobile tag; and
the module using the I and Q complex signal parameters data to calculate a bearing of the mobile tag from the positioning device.

7. A method as claimed in claim 6, comprising one of:
a) the module using the bearing and information regarding a location and orientation of the positioning device to calculate a location of the mobile tag; or
b) the module receiving data representing I and Q complex signal parameters of signals transmitted by the mobile tag and received at each of at least three antenna elements forming part of a second positioning device, and
the module using the I and Q complex signal parameters data to calculate a bearing of the mobile tag from the second positioning device, and
the module using the bearing and information regarding a location and an orientation of each of the first and second positioning devices to calculate a location of the mobile tag.

8. A method as claimed in claim 6, wherein the mobile tag forms part of the mobile device, the method comprising:
the mobile tag transmitting a signal modulated with a code sequence; and
the module using the code sequence to calculate the bearing.

9. Apparatus comprising:
at least one processor; and
at least one memory including computer program code;
the at least one memory and the computer program code configured to, with the at least one processor, cause the apparatus to perform:
obtaining in-phase and quadrature (I and Q) complex signal parameters of signals received from a mobile tag at each of at least three antenna elements forming part of a positioning device;
extracting an identifier modulated onto the signals received from the mobile tag; and
causing transmission of the I and Q complex signal parameters and the identifier, to allow a position calculating device to calculate a bearing of the mobile tag from the positioning device.

10. Apparatus as claimed in claim 9, further comprising at least one of:
a) the obtaining I and Q complex signal parameters comprises obtaining signal parameters of at least two different signals for each of the at least three antenna elements; or
b) the obtaining I and Q complex signal parameters comprises obtaining inphase and quadrature samples of signals received at each of the at least three antenna elements; or
c) the transmitting the I and Q complex signal parameters and the identifier comprises the positioning device wirelessly broadcasting the I and Q complex signal parameters and the identifier; or
d) the at least one memory and the computer program code are further configured to, with the at least one processor, cause the apparatus to perform applying a predetermined delay between receiving the signals from the mobile tag and transmitting the I and Q complex signal parameters and the identifier.

11. Apparatus as claimed in claim 9, wherein the transmitting the I and Q complex signal parameters and the identifier comprises one of:
a) sending, from the positioning device, the I and Q complex signal parameters and the identifier to a server; or
b) routing the I and Q complex signal parameters and the identifier from the positioning device to a beacon located proximal to the position calculating device via plural intermediaries.

12. Apparatus as claimed in claim 9, wherein the at least one memory and the computer program code are further configured to, with the at least one processor, cause the apparatus to perform encrypting the complex signal parameters and the identifier prior to transmitting.

13. Apparatus comprising:
at least one processor; and
at least one memory including computer program code;
the at least one memory and the computer program code configured to, with the at least one processor, cause the apparatus to perform:
receiving one or more data packets including:
data representing in-phase and quadrature (I and Q) complex signal parameters of signals transmitted by a mobile tag and received at each of at least three antenna elements forming part of a positioning device, and
data representing an identifier transmitted by the mobile tag; and
using the I and Q complex signal parameters data to calculate a bearing of the mobile tag from the positioning device.

14. Apparatus as claimed in claim 13, further comprising one of:
a) wherein the at least one memory and the computer program code are further configured to, with the at least one processor, cause the apparatus to perform using the bearing and information regarding a location and orientation of the positioning device to calculate a location of the mobile tag; or b) wherein the at least one memory and the computer program code are further configured to, with the at least one processor, cause the apparatus to perform:

receiving data representing complex signal parameters of signals transmitted by the mobile tag and received at each of at least three antenna elements forming part of a second positioning device, and using the complex signal parameters data to calculate a bearing of the mobile tag from the second positioning device, and using the bearing and information regarding a location and an orientation of each of the first and second positioning devices to calculate a location of the mobile tag; or c) wherein the mobile tag comprises a transmitter for transmitting a signal modulated with a code sequence, and wherein the at least one memory and the computer program code are further configured to, with the at least one processor, cause the apparatus to perform using the code sequence to calculate the bearing.

15. A non-transitory computer readable storage medium comprising computer executable program code stored thereon that when executed by a processor causes an apparatus to perform the method of claim 1.

16. A non-transitory computer readable storage medium comprising computer executable program code stored thereon that when executed by a processor causes an apparatus to perform the method of claim 6.

* * * * *